(12) United States Patent
Alfred et al.

(10) Patent No.: US 11,186,357 B2
(45) Date of Patent: Nov. 30, 2021

(54) SYSTEM AND METHOD FOR CONTROLLING ROTORCRAFT

(71) Applicant: Textron Innovations Inc., Providence, RI (US)

(72) Inventors: Jillian Samantha Alfred, Ft. Worth, TX (US); Luke Dafydd Gillett, Grapevine, TX (US); Robert Earl Worsham, II, Weatherford, TX (US); Sung Kyun Kim, Bedford, TX (US)

(73) Assignee: Textron Innovations Inc., Providence, RI (US)

( * ) Notice: Subject to any disclaimer, the term of this patent is extended or adjusted under 35 U.S.C. 154(b) by 217 days.

(21) Appl. No.: 16/238,889

(22) Filed: Jan. 3, 2019

(65) Prior Publication Data

US 2020/0216165 A1    Jul. 9, 2020

(51) Int. Cl.
| | |
|---|---|
| *G05D 1/08* | (2006.01) |
| *B64C 13/16* | (2006.01) |
| *B64C 13/04* | (2006.01) |
| *B64C 27/605* | (2006.01) |
| *B64C 27/57* | (2006.01) |

(52) U.S. Cl.
CPC ............ *B64C 13/16* (2013.01); *B64C 13/044* (2018.01); *B64C 13/0421* (2018.01); *B64C 27/605* (2013.01); *G05D 1/0816* (2013.01); *B64C 27/57* (2013.01)

(58) Field of Classification Search
CPC ...... B64C 13/16; B64C 27/57; G05D 1/0825; G05D 1/0816
See application file for complete search history.

(56) References Cited

U.S. PATENT DOCUMENTS

| | | | | |
|---|---|---|---|---|
| 3,756,543 | A * | 9/1973 | Fowler | G05D 1/0858 244/177 |
| 6,189,836 | B1 * | 2/2001 | Gold | G05D 1/0816 244/17.13 |
| 8,209,069 | B1 * | 6/2012 | McLoughlin | G01C 21/165 701/11 |
| 2010/0116925 | A1 * | 5/2010 | Segal | G05D 1/0816 244/17.13 |
| 2017/0336808 | A1 * | 11/2017 | Luo | B64C 39/024 |
| 2018/0251207 | A1 * | 9/2018 | Kim | B64C 13/503 |

* cited by examiner

*Primary Examiner* — Philip J Bonzell
*Assistant Examiner* — Tye William Abell
(74) *Attorney, Agent, or Firm* — Slater Matsil, LLP

(57) ABSTRACT

In an embodiment, a method includes: obtaining a first signal from a first sensor of a rotorcraft, the first signal indicating measured angular velocity around a first axis of the rotorcraft; filtering the first signal with a lag compensator to estimate angular position around the first axis of the rotorcraft; and adjusting flight control devices of the rotorcraft according to the estimated angular position and the measured angular velocity around the first axis of the rotorcraft, thereby changing flight characteristics of the rotorcraft around the first axis of the rotorcraft.

24 Claims, 7 Drawing Sheets

SYSTEM AND METHOD FOR CONTROLLING ROTORCRAFT

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload.

SUMMARY

In an embodiment, a method includes: obtaining a first signal from a first sensor of a rotorcraft, the first signal indicating measured angular velocity around a first axis of the rotorcraft; filtering the first signal with a lag compensator to estimate angular position around the first axis of the rotorcraft; and adjusting flight control devices of the rotorcraft according to the estimated angular position and the measured angular velocity around the first axis of the rotorcraft, thereby changing flight characteristics of the rotorcraft around the first axis of the rotorcraft.

In some embodiments, the method further includes: receiving a control signal from a pilot flight control of the rotorcraft; and adjusting the flight control devices of the rotorcraft according to the control signal, thereby changing flight characteristics of the rotorcraft around a second axis of the rotorcraft, the second axis being different from the first axis, where the flight characteristics of the rotorcraft around the first axis of the rotorcraft are changed in response to changing the flight characteristics of the rotorcraft around the second axis of the rotorcraft. In some embodiments of the method, the first sensor is a rate sensor, and obtaining the first signal includes: receiving the first signal from the rate sensor. In some embodiments of the method, the first sensor is an accelerometer, and obtaining the first signal includes: receiving a transduced sensor signal from the accelerometer, the transduced sensor signal indicating angular acceleration around the first axis of the rotorcraft; and integrating the transduced sensor signal with respect to time to obtain the first signal. In some embodiments of the method, the angular position around the first axis of the rotorcraft is estimated using only the measured angular velocity around the first axis of the rotorcraft. In some embodiments of the method, the lag compensator has a same set of gains at all operating points of the lag compensator, the set of gains being predetermined independent of airspeed of the rotorcraft. In some embodiments of the method, the lag compensator has different sets of gains at different operating points of the lag compensator. In some embodiments of the method, adjusting the flight control devices of the rotorcraft includes: executing a first flight control procedure according to the angular position around the first axis of the rotorcraft estimated with the first signal; and executing a second flight control procedure according to the angular position around the first axis of the rotorcraft measured with a second signal from a second sensor, where the first flight control procedure has greater authority than the second flight control procedure, where the first sensor is a rate sensor and the second sensor is an absolute sensor.

In an embodiment, a rotorcraft includes: a first sensor; flight control devices; and a flight control computer coupled to the first sensor and the flight control devices, the flight control computer configured to: obtain a first signal from the first sensor, the first signal indicating measured angular velocity around a first axis of the rotorcraft; filter the first signal with a lag compensator to estimate angular position around the first axis of the rotorcraft; and adjust the flight control devices according to the estimated angular position and the measured angular velocity around the first axis of the rotorcraft, thereby changing flight characteristics of the rotorcraft around the first axis of the rotorcraft.

In some embodiments, the rotorcraft further includes: a pilot flight control, where the flight control computer is further configured to: receive a control signal from the pilot flight control; and adjust the flight control devices according to the control signal, thereby changing flight characteristics of the rotorcraft around a second axis of the rotorcraft, the second axis being different from the first axis, where the flight characteristics of the rotorcraft around the first axis of the rotorcraft are changed in response to changing the flight characteristics of the rotorcraft around the second axis of the rotorcraft. In some embodiments of the rotorcraft, the first sensor is a rate sensor, and the flight control computer is configured to obtain the first signal by: receiving the first signal from the rate sensor. In some embodiments of the rotorcraft, the first sensor is an accelerometer, and the flight control computer is configured to obtain the first signal by: receiving a transduced sensor signal from the accelerometer, the transduced sensor signal indicating angular acceleration around the first axis of the rotorcraft; and integrating the transduced sensor signal with respect to time to obtain the first signal. In some embodiments of the rotorcraft, the angular position around the first axis of the rotorcraft is estimated using only the measured angular velocity around the first axis of the rotorcraft. In some embodiments of the rotorcraft, the lag compensator has a same set of gains at all operating points of the lag compensator, the set of gains being predetermined independent of airspeed of the rotorcraft. In some embodiments of the rotorcraft, the lag compensator has different sets of gains at different operating points of the lag compensator. In some embodiments of the rotorcraft, the flight control computer is configured to adjust the flight control devices of the rotorcraft by: executing a first flight control procedure according to the angular position around the first axis of the rotorcraft estimated with the first signal; and executing a second flight control procedure according to the angular position around the first axis of the rotorcraft measured with a second signal from a second sensor, where the first flight control procedure has greater authority than the second flight control procedure, where the first sensor is a rate sensor and the second sensor is an absolute sensor.

In an embodiment, a flight control computer includes: a processor; and a non-transitory computer readable storage medium storing programming for execution by the processor, the programming including instructions for: obtaining a first signal from a first sensor of a rotorcraft, the first signal indicating measured angular velocity around a first axis of the rotorcraft; filtering the first signal with a lag compensator to estimate angular position around the first axis of the rotorcraft; and adjusting flight control devices of the rotorcraft according to the estimated angular position and the measured angular velocity around the first axis of the rotorcraft, thereby changing flight characteristics of the rotorcraft around the first axis of the rotorcraft.

In some embodiments of the flight control computer, the programming includes further instructions for: receiving a control signal from a pilot flight control of the rotorcraft; and adjusting the flight control devices of the rotorcraft according to the control signal, thereby changing flight characteristics of the rotorcraft around a second axis of the rotorcraft, the second axis being different from the first axis, where the flight characteristics of the rotorcraft around the first axis of the rotorcraft are changed in response to changing the flight characteristics of the rotorcraft around the second axis of the rotorcraft. In some embodiments of the flight control computer, the first sensor is a rate sensor, and the instructions for obtaining the first signal include instructions for: receiving the first signal from the rate sensor. In some embodiments of the flight control computer, the first sensor is an accelerometer, and the instructions for obtaining the first signal include instructions for: receiving a transduced sensor signal from the accelerometer, the transduced sensor signal indicating angular acceleration around the first axis of the rotorcraft; and integrating the transduced sensor signal with respect to time to obtain the first signal. In some embodiments of the flight control computer, the angular position around the first axis of the rotorcraft is estimated using only the measured angular velocity around the first axis of the rotorcraft. In some embodiments of the flight control computer, the lag compensator has a same set of gains at all operating points of the lag compensator, the set of gains being predetermined independent of airspeed of the rotorcraft. In some embodiments of the flight control computer, the lag compensator has different sets of gains at different operating points of the lag compensator. In some embodiments of the flight control computer, the instructions for adjusting the flight control devices of the rotorcraft includes instructions for: executing a first flight control procedure according to the angular position around the first axis of the rotorcraft estimated with the first signal; and executing a second flight control procedure according to the angular position around the first axis of the rotorcraft measured with a second signal from a second sensor, where the first flight control procedure has greater authority than the second flight control procedure, where the first sensor is a rate sensor and the second sensor is an absolute sensor.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
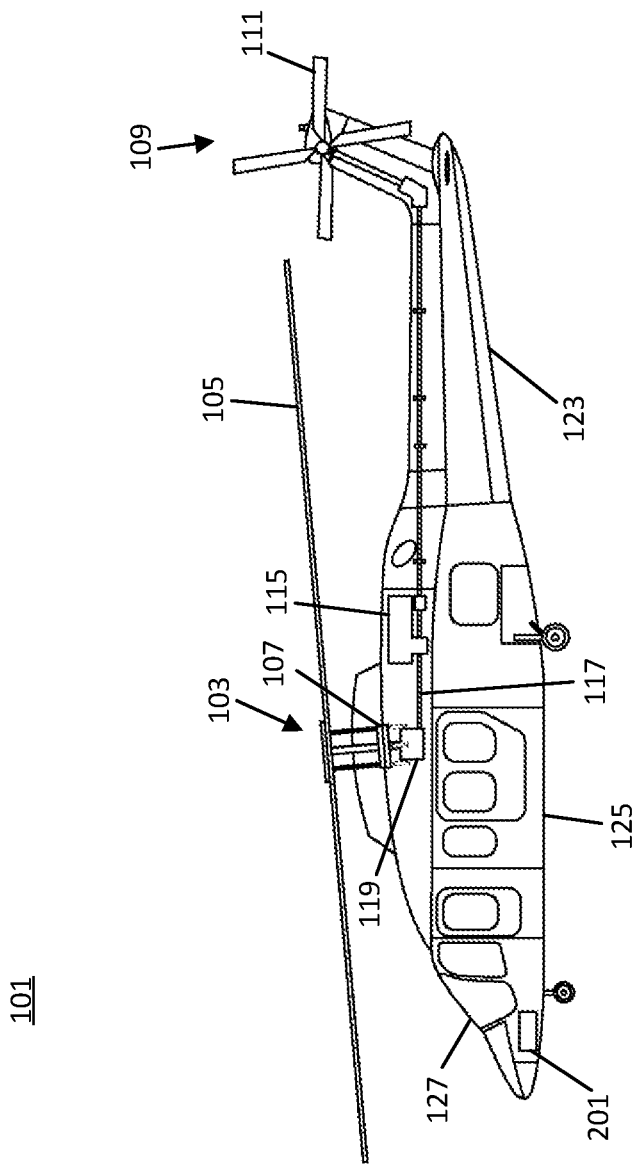
FIG. 1 illustrates a rotorcraft, according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures, provide for default or suggested control positioning, or the like.

FBW systems for rotorcraft must provide stable flight characteristics for FBW system controlled flight parameters while permitting the pilot to override or adjust any suggested flight parameters suggested by the FBW system. Additionally, in providing enhanced control and automated functionality for rotorcraft flight, the FBW system must maintain an intuitive and easy to use flight control system for the pilot. Thus, the FBW system adjusts the pilot flight controls so that the controls are in a position associated with the relevant flight parameter. For example, the FBW system may adjust the collective stick to provide suggested or FBW system controlled flight parameters, and which reflect a collective or power setting. Thus, when the pilot releases the collective stick and the FBW system provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system use the cyclic stick to, for example, adjust for turbulence, drift or other disturbance to the flight path, and may move the cyclic stick as the FBW system compensates the cyclic control. Thus, when the pilot grasps the cyclic stick to take control of flight from the FBW system, the cyclic stick is positioned to reflect the actual cyclic settings.

FIG. 1 illustrates a rotorcraft 101, according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the main rotor system 103 and the anti-torque system through a main rotor transmission 119 and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, rotorcraft 101 could be configured as an unmanned vehicle, in which case cockpit 127 could be eliminated entirely in order to save space and cost.

Figure 2A:
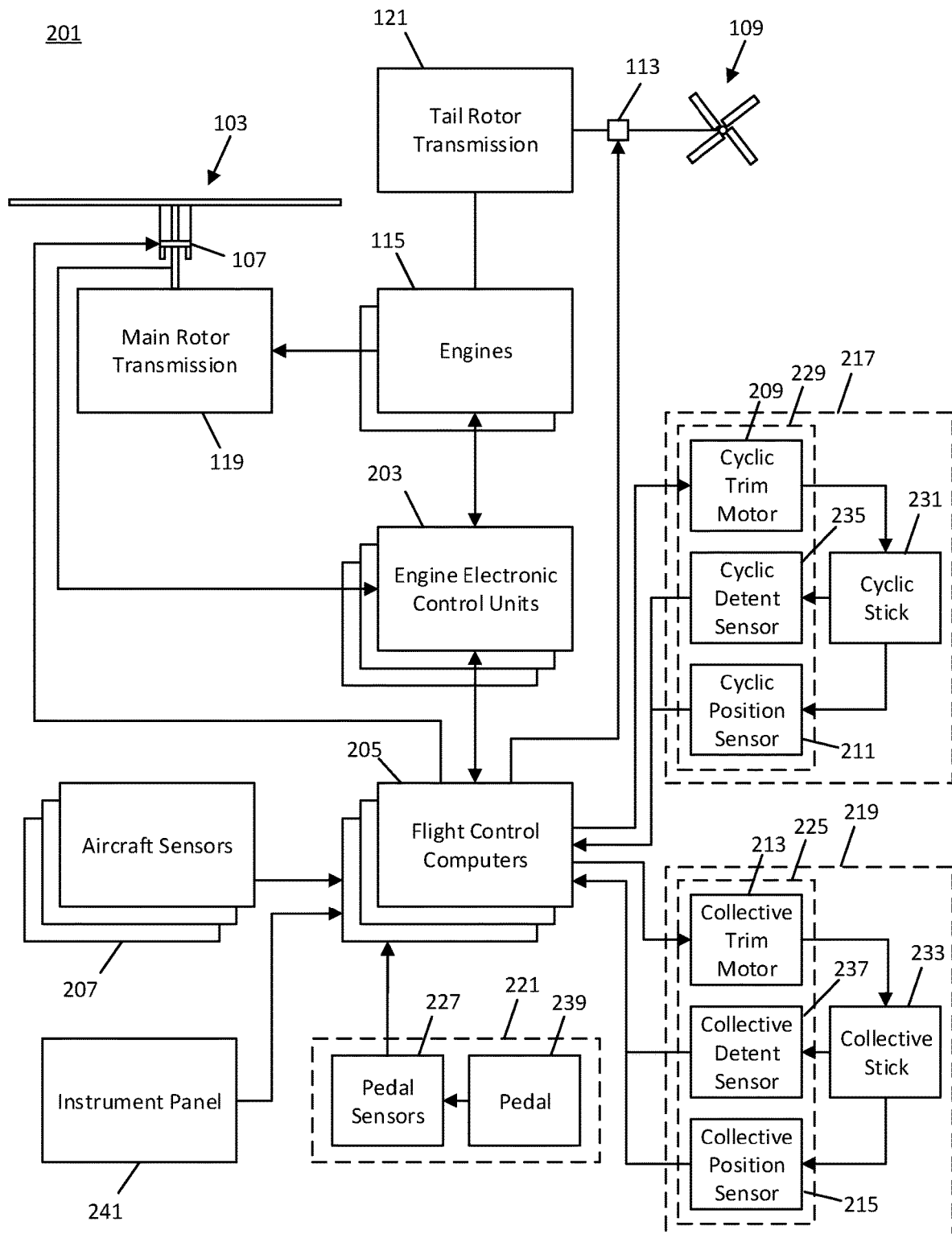
FIG. 2A is a block diagram of a fly-by-wire flight control system, according to some embodiments.
Figure 2B:
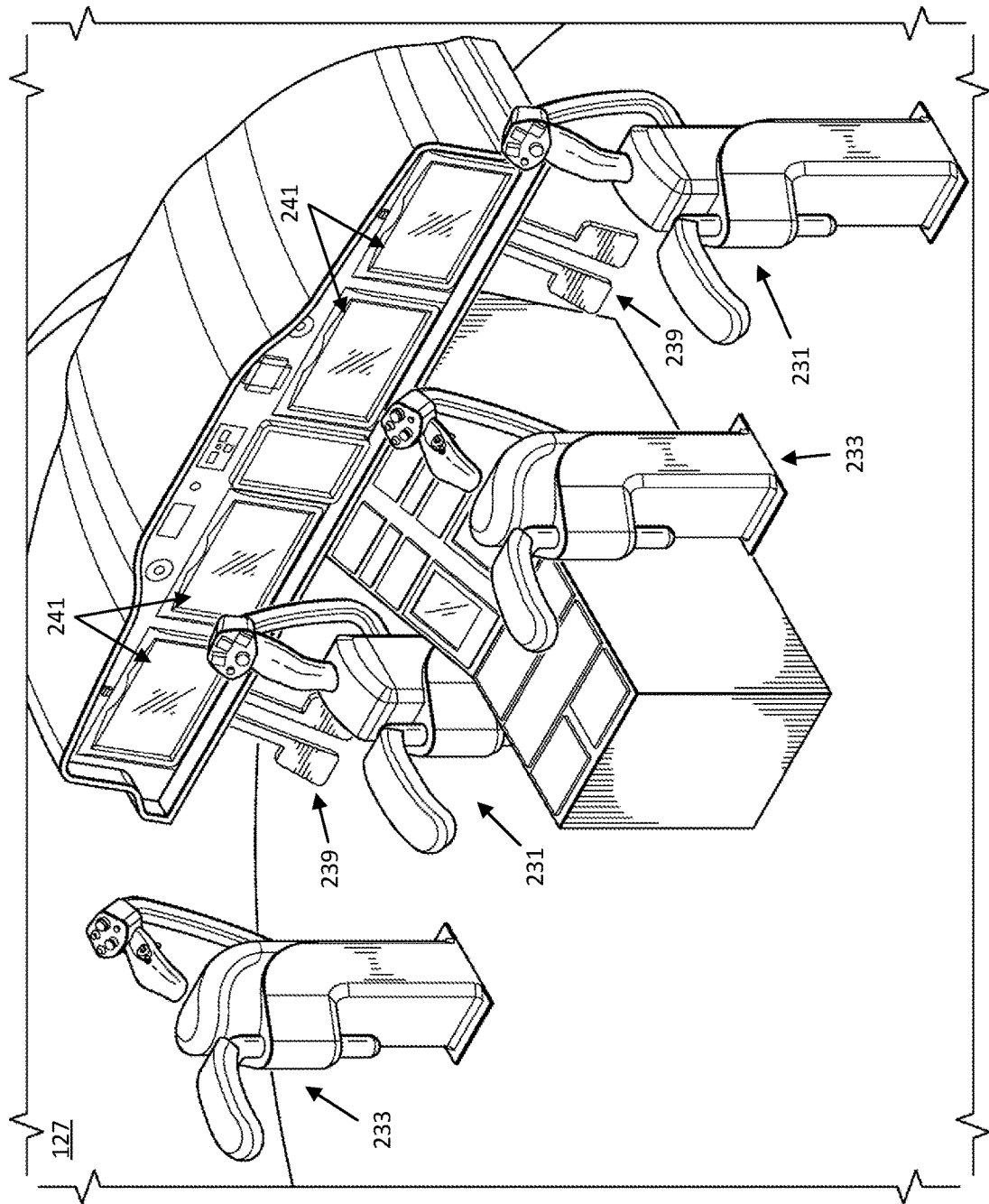
FIG. 2B illustrates the inside of a cockpit, according to some embodiments.

FIG. 2A is a block diagram of a fly-by-wire flight control system 201 for the rotorcraft 101, according to some embodiments. FIG. 2B illustrates the inside of the cockpit 127, according to some embodiments, and is described in conjunction with FIG. 2A. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal control assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft 101. Flight control devices on the rotorcraft may include mechanical and/or electrical systems operable to change the positions or angle of attack of the main rotor blades 105 and the tail rotor blades 111 or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes engine control computers (ECCUs) 203, flight control computers (FCCs) 205, and aircraft sensors 207, which collectively adjust the flight control devices.

The flight control system 201 has one or more FCCs 205. In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cueing commands to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such as measured revolutions per minute (RPM) of the main rotor blades.

The aircraft sensors 207 are in communication with the FCCs 205. The aircraft sensors 207 may include sensors for measuring a variety of rotorcraft systems, flight parameters, environmental conditions and the like. For example, the aircraft sensors 207 may include sensors for measuring airspeed, altitude, attitude, position, orientation, temperature, airspeed, vertical speed, and the like. Other aircraft sensors 207 could include sensors relying upon data or signals originating external to the rotorcraft, such as a global positioning system (GPS) sensor, a VHF Omnidirectional Range sensor, Instrument Landing System (ILS), and the like.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic stick 231. In some embodiments, the cyclic stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic stick 231. In some embodiments, the FCCs 205 determine a suggested cyclic stick position for the cyclic stick 231 according to one or more of the collective stick position, the pedal position, the speed, altitude and attitude of the rotorcraft, the engine revolutions per minute (RPM), engine temperature, main rotor RPM, engine torque or other rotorcraft system conditions or flight conditions. The suggested cyclic stick position is a position determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 209 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective stick 233 in the collective control assembly 219. In some embodiments, the collective stick 233 is a single control stick that moves along a single axis or with a lever type action. A collective position sensor 215 detects the position of the collective stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective stick 233. Similar to the determination of the suggested cyclic stick position, in some embodiments, the FCCs 205 determine a suggested collective stick position for the collective stick 233 according to one or more of the cyclic stick position, the pedal position, the speed, altitude and attitude of the rotorcraft, the engine RPM, engine temperature, main rotor RPM, engine torque or other rotorcraft system conditions or flight conditions. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic trim motors 209 and collective trim motors 213 may drive the cyclic stick 231 and collective stick 233, respectively, to suggested positions. The cyclic trim motors 209 and collective trim motors 213 may drive the cyclic stick 231 and collective stick 233, respectively, to suggested positions, but this movement capability may also be used to provide tactile cueing to a pilot. The cyclic trim motors 209 and collective trim motors 213 may push the respective stick in a particular direction when the pilot is moving the stick to indicate a particular condition. Since the FBW system mechanically disconnects the stick from one or more flight control devices, a pilot may not feel a hard stop, vibration, or other tactile cue that would be inherent in a stick that is mechanically connected to a flight control assembly. In some embodiments, the FCCs 205 may cause the cyclic trim motors 209 and collective trim motors 213 to push against a pilot command so that the pilot feels a resistive force, or may command one or more friction devices to provide friction that is felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is holding the cyclic stick 231, while the collective control assembly 219 has a collective detent sensor 237 that determines whether the pilot is holding the collective stick 233. The cyclic detent sensor 235 and collective detent sensor 237 detect motion and/or position of the respective control stick that is caused by pilot input, as opposed to motion and/or position caused by commands from the FCCs 205, rotorcraft vibration, and the like and provide feedback signals indicative of such to the FCCs 205. When the FCCs 205 detect that a pilot has control of, or is manipulating, a particular control, the FCCs 205 may determine that stick to be out-of-detent (00D). Likewise, the FCCs may determine that the stick is in-detent (ID) when the signals from the detent sensors indicate to the FCCs 205 that the pilot has released a particular stick. The FCCs 205 may provide different default control or automated commands to one or more flight systems based on the detent status of a particular stick or pilot control.

Figure 3:
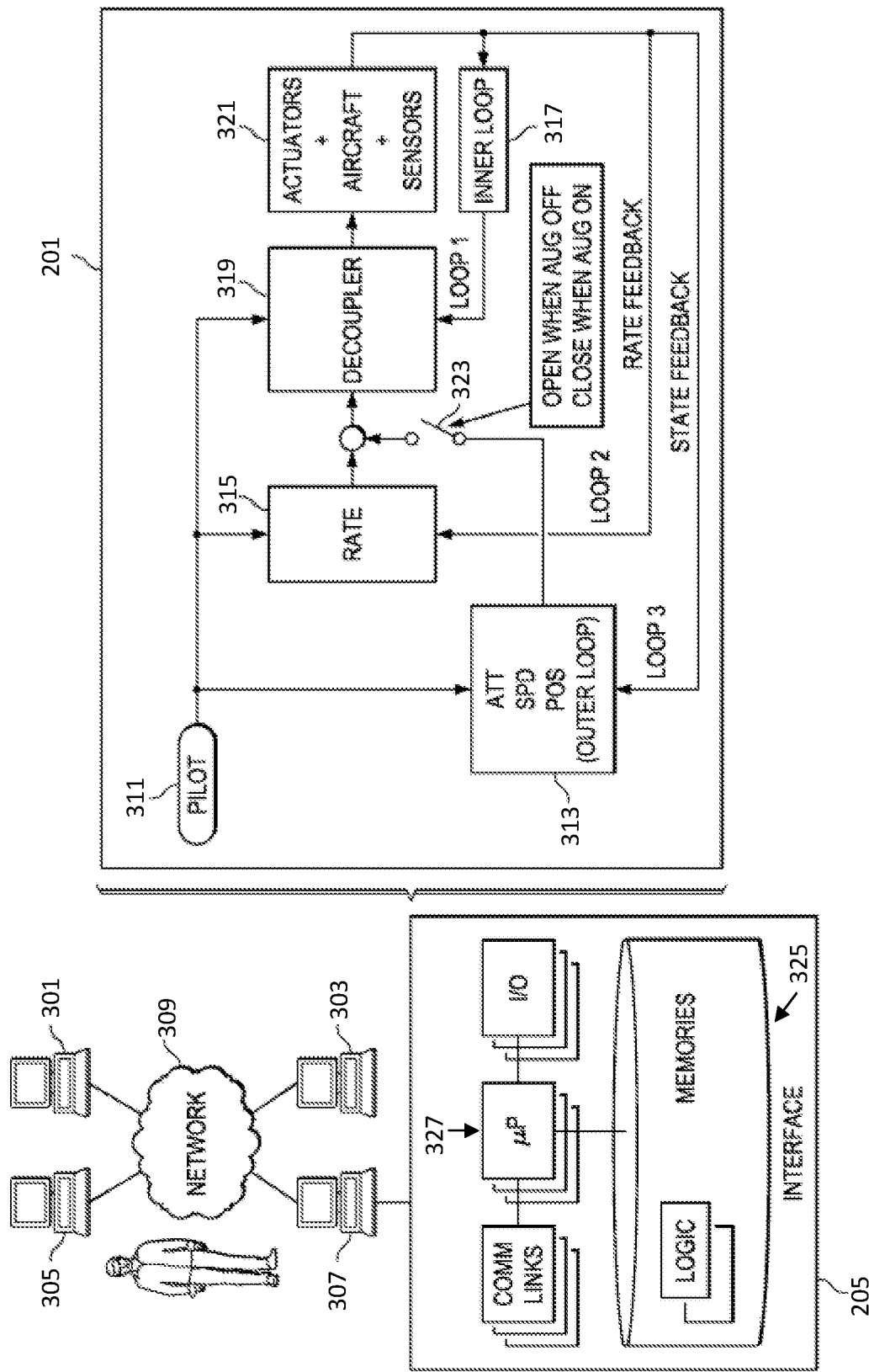
FIG. 3 is a block diagram of a three-loop flight control system, according to some embodiments.

FIG. 3 is a block diagram of the flight control system 201, according to some embodiments. Some operational aspects of the flight control system 201 are shown in a highly schematic fashion. In particular, the flight control system 201 is schematically shown as being implemented as a series of inter-related feedback loops running certain control laws. Although the flight control system 201 is illustrated as being a three-loop flight control system, it should be appreciated that the flight control system 201 could be implemented in a different manner, such as with a different quantity of control loops.

In some embodiments, elements of the flight control system 201 may be implemented at least partially by the FCCs 205. For example, the flight control system 201 may be realized as programming executed by the FCCs 205. The programming includes instructions implementing aspects of the flight control system 201. The FCCs 205 may include memories 325, such as non-transitory computer readable storage mediums, that store the programming. One or more processors 327 are connected to the memories 325, and are operable to execute the programming. However, all, some, or none of the components (301, 303, 305, 307) of flight control system 201 could be located external or remote from the rotorcraft 101 and communicate to on-board devices through a network connection 309.

The flight control system 201 has a pilot input 311, an outer loop 313, a middle loop 315, an inner loop 317, a decoupler 319, and aircraft equipment 321 (corresponding, e.g., to flight control devices such as swashplate 107, tail rotor transmission 121, etc.; to actuators (not shown) driving the flight control devices; to sensors such as aircraft sensors 207, cyclic position sensors 211, collective position sensors 215, cyclic detent sensors 235, collective detent sensors 237, etc.; and the like).

In the example shown, a three-loop design separates the inner stabilization and rate feedback loops from outer guidance and tracking loops. The control law structure primarily assigns the overall stabilization task and related tasks of reducing pilot workload to inner loop 317. Next, the middle loop 315 (sometimes called the rate loop) provides rate augmentation. Outer loop 313 focuses on guidance and tracking tasks. Since inner loop 317 and middle loop 315 provide most of the stabilization, less control effort is required at the outer loop level. As representatively illustrated, a switch 323 may be provided to turn outer loop flight augmentation on and off, the tasks of outer loop 313 are not necessary for flight stabilization.

In some embodiments, the inner loop 317 and middle loop 315 use a set of gains for filters applied to roll/pitch/yaw 3-axis rate gyro and acceleration feedback sensors. Both the inner loop 317 and middle loop 315 may stay active, independent of various outer loop hold modes. Outer loop 313 may include cascaded layers of loops, including an attitude loop, a speed loop, a position loop, a vertical speed loop, an altitude loop, and a heading loop. According to some embodiments, the control laws running in the loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain.

The outer loop 313, middle loop 315, and inner loop 317 control flight of the rotorcraft 101 according to signals received from the aircraft sensors 207. The aircraft sensors 207 may include multiple types of sensors. In particular, the aircraft sensors 207 may include sensors that perform absolute measurement or sensors that perform rate measurement. Rate sensors report rate changes in a value. For example, angular rate sensors may be used to report a speed of a rolling motion. Absolute sensors (such as attitude sensors) report a value within a scale or range. For example, absolute attitude sensors report an angular position of the rotorcraft 101 around one or more axes of the rotorcraft 101, which may be evaluated to detect rolling motion of the rotorcraft 101. Different types of sensors have different costs and reliabilities. Reliable absolute sensors tend to be costly. At a given price point, rate sensors tend to be more reliable than absolute attitude sensors. According to some embodiments, less costly rate sensors may be used for measurements in the inner loop 317.

Filters are applied by, e.g., the inner loop 317 and/or middle loop 315, to signals received or obtained from the aircraft sensors 207. The filters each have a set of gains. Depending on the function of the various aircraft sensors 207, gain scheduling may be used for some of the filters. For example, different sets of gains may be used for some aircraft sensor filters at different airspeeds of the rotorcraft 101. Further, some of the control loops 313/315/317 may, depending on their functionality, call for specific levels of reliability (e.g., for safety reasons). Such reliability requirements may preclude the use of some sensors, such as absolute attitude sensors, that may not meet the reliability level required by a particular control loop.

The flight control system 201 relies on accurately determining the angular position of the rotorcraft 101 across the envelope of possible airspeeds when controlling flight. In particular, all three loops of the flight control system 201 control flight according to the angular position around the various axes (e.g., the roll, pitch, and yaw) of the rotorcraft 101. The use of inaccurate angular position values may degrade the performance of the control laws implemented by the flight control system 201, and may result in partial or total failure of the rotorcraft 101.

According to some embodiments, the angular position of the rotorcraft 101 is determined and used by the inner loop 317 with only rate sensors. Signals from one or more rate sensors of the rotorcraft 101 are obtained and filtered to estimate the angular position of the rotorcraft 101 around one or more axes of the rotorcraft 101. The signals are filtered with a lag compensator. In some embodiments, the lag compensator has a same set of gains, and gain scheduling at different airspeeds is not performed. In some embodiments, the lag compensator has a variable set of gains, and gain scheduling is performed at different airspeeds. Although the resulting signal contains an estimated angular position of the rotorcraft 101, which may be less accurate than absolute attitude sensors at some airspeeds, the estimated angular position may on average be more accurate than absolute attitude sensors across the envelope of all possible airspeeds. In other words, the estimated angular position may on average be a more reliable value, even if it is less accurate in some situations. As such, in accordance with such embodiments, the inner loop 317 does not depend on absolute attitude sensors, which may improve the reliability of flight control across the envelope of possible airspeeds.

Figure 4:
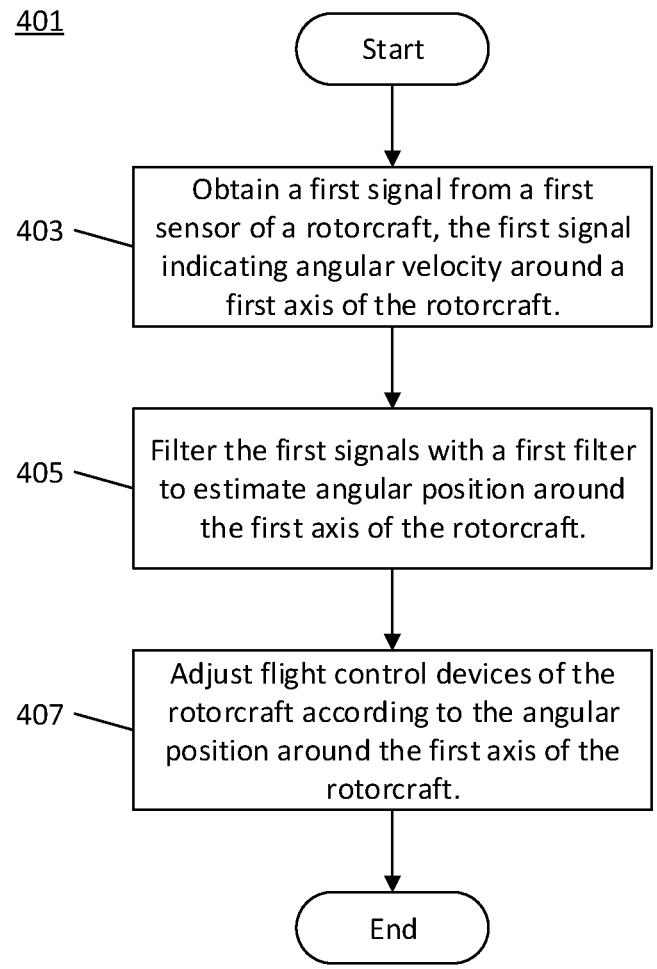
FIG. 4 is a flow diagram of a method for controlling flight of a rotorcraft, according to some embodiments.

FIG. 4 is a flow diagram of a method 401 for controlling flight of the rotorcraft 101, according to some embodiments. In the method 401, the inner loop 317 estimates the angular position of the rotorcraft 101 using rate sensors, instead of with absolute attitude sensors. The estimated angular position may be initialized with a zero value, and may be updated using rate sensor data during operation.

In process 403, a first signal is obtained from a first sensor of the rotorcraft 101. The first sensor is one of the aircraft sensors 207. The first signal indicates angular velocity around a first axis of the rotorcraft 101. The first axis may be the roll, pitch, or yaw axis of the rotorcraft 101.

In some embodiments, the first signal is a transduced signal from the first sensor. For example, the first sensor may be a rate sensor that reports rates instead of absolute values, such as a gyroscope, and the transduced signal from the gyroscope directly contains the angular velocity.

In some embodiments, the first signal is obtained by manipulating the transduced signal from the first sensor. For example, the first sensor may be an accelerometer, and the first signal may be obtained by receiving the transduced sensor signal from the accelerometer, and integrating the transduced sensor signal with respect to time to obtain the first signal. In such embodiments, the transduced signal indicates angular acceleration around the first axis of the rotorcraft, and may be said to indirectly contain the angular rate.

In process 405, the first signal is filtered with a first filter to estimate angular position around the first axis of the rotorcraft 101. The first filter may be a first-order lag compensator (e.g., a filter having a single pole in the complex plane, with the pole being less than zero). The lag compensator has a 90-degree phase lag. Notably, the inner loop 317 only estimates angular position around the first axis of the rotorcraft 101 using the angular velocity around the first axis. The inner loop 317 does not use values from absolute sensors in estimating the angular position.

In some embodiments, gain scheduling is not used when filtering the first signal. Although gain scheduling at different airspeeds may allow for better aircraft handling qualities, airspeed sensors have varying reliability. When a sufficiently reliable airspeed sensor is unavailable, the first filter has a same set of gains at all operating points of the first filter. The set of gains of the first filter are predetermined independent of airspeed of the rotorcraft 101. Using a lag compensator with fixed gains may allow reliability requirements to be met while affording adequate aircraft handling qualities. In some embodiments, such as embodiments where reliable airspeed sensors are available, gain scheduling may be used when filtering the first signal.

Optionally, the first signal is further filtered with a second filter. The second filter may be a washout filter that compliments the first filter (e.g., the lag compensator). The lag compensator removes the high frequency dynamics of rate feedback, allowing the angular velocity in the first signal to approximate the angular position. The washout filter removes the low frequency dynamics of rate feedback, so that the overall feedback loop does not provide control when the rotorcraft 101 is in a steady trim condition. Combining the rate, lagged rate, and washed out rate allows the inner loop 317 to provide stabilizing feedback with finite bandwidth.

In process 407, flight control devices of the rotorcraft 101 are adjusted according to the estimated angular position around the first axis of the rotorcraft 101. Flight characteristics of the rotorcraft 101 are thereby changed around the first axis of the rotorcraft 101. The flight control devices may be automatically adjusted by, e.g., the decoupler 319, in response to pilot input and based on the estimated angular position. For example, a control signal may be received from a pilot flight control of the rotorcraft 101, and the flight control devices of the rotorcraft 101 may be adjusted according to the control signal. The decoupler 319 may automatically adjust the flight control devices to control flight around a first axis, and the pilot flight control may be attempting to adjust the flight control devices to control flight around a second axis, which may be different from the first axis.

In some embodiments, the flight control devices of the rotorcraft 101 are adjusted according to, jointly, the angular velocity around the first axis of the rotorcraft 101 (measured with the first sensor) and the estimated angular position around the first axis of the rotorcraft 101 (from the first filter). For example, the inner loop 317 may use both the estimated angular position and the measured angular velocity when performing controlling, decoupling, or stabilizing functions.

Figure 5:
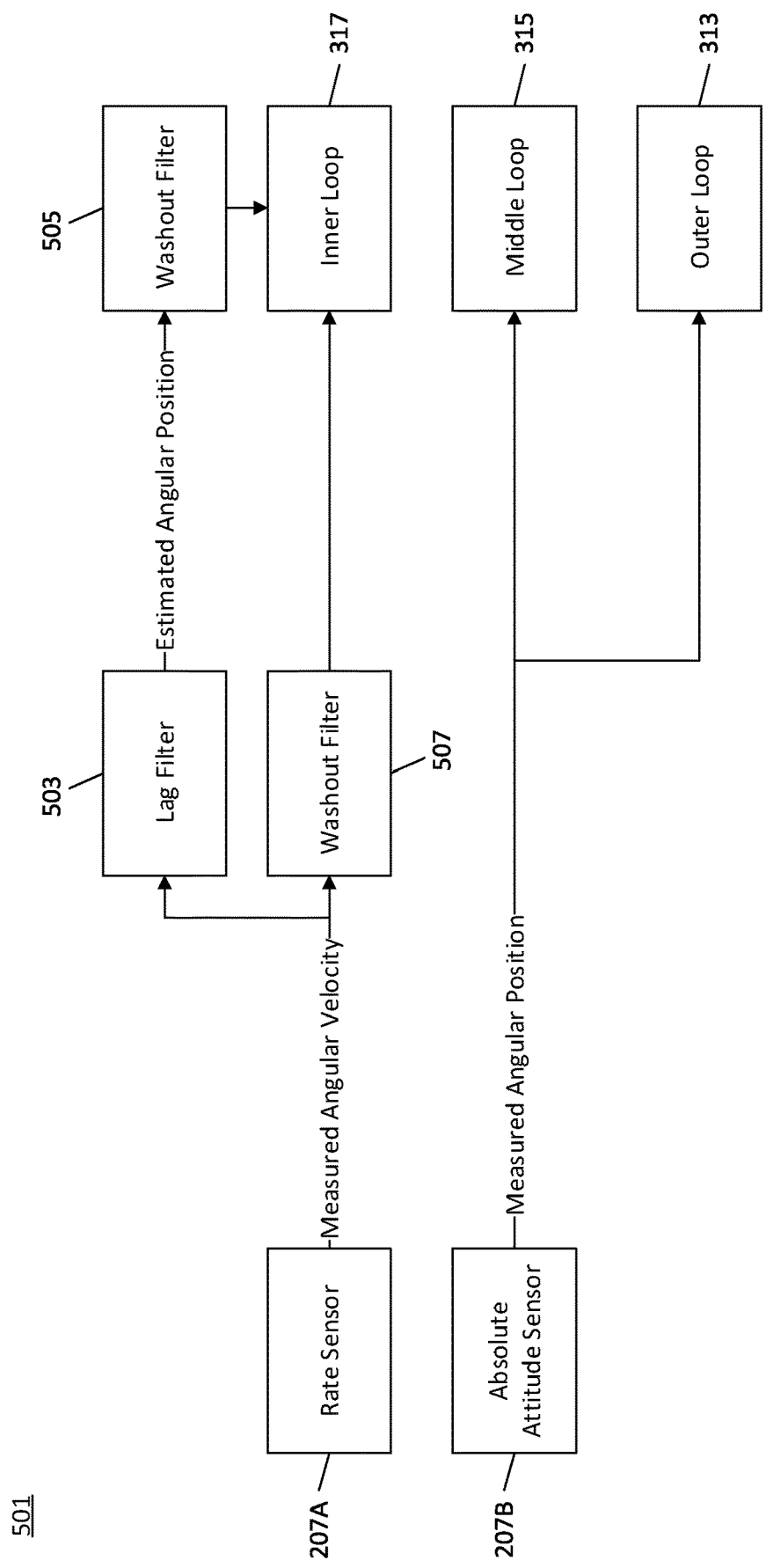
FIG. 5 is a block diagram of a second system for vertical speed estimation, according to some embodiments.

FIG. 5 is a block diagram of a system 501 for controlling flight of the rotorcraft 101, according to some embodiments. The method 401 may be executed by the system 501. In the system 501, a rate sensor 207A and an absolute attitude sensor 207B are used to control flight of the rotorcraft 101. A lag filter 503 receives a measurement of angular velocity from the rate sensor 207A and uses it to estimate angular position of the rotorcraft. The inner loop 317 adjusts the flight control devices of the rotorcraft 101 according to both the measured angular velocity (e.g., rate sensor 207A feedback) and estimated angular position (e.g., lagged rate sensor 207A feedback) of the rotorcraft 101.

According to some embodiments, the flight control system 201 may also use absolute attitude sensors in addition to estimating angular position using rate sensors. For example, the inner loop 317 may estimate the angular position of the rotorcraft 101 using rate sensors, but other control loops such as the middle loop 315 and/or outer loop 313 may measure the angular position of the rotorcraft 101 using absolute attitude sensors. In such embodiments, the estimated angular position may be used for lower-level functions where reliability is critical such as decoupling (e.g., in the inner loop 317), and values from the absolute attitude sensors may be used for higher-level functions where accuracy is critical such as flight directing or navigation (e.g., in the middle loop 315 and/or outer loop 313). In such embodiments, flight control devices of the rotorcraft 101 are adjusted by executing a first flight control procedure (e.g., as part of the inner loop 317) according to the angular position around the first axis of the rotorcraft estimated with the first signal from the rate sensor 207A, and by executing a second flight control procedure (e.g., as part of the middle loop 315 and/or outer loop 313) according to the angular position around the first axis of the rotorcraft indicated by a second signal from the absolute attitude sensor 207B. The first flight control procedure has greater authority than the second flight control procedure. The estimated angular position (e.g., lagged rate sensor 207A feedback) and/or the measured angular velocity (e.g., from the rate sensor 207A) may be filtered with washout filters 505, 507.

In some embodiments, the inner loop 317 combines rate sensor signals for the roll, pitch, and yaw axes to estimate the longitude, latitude, and altitude of the rotorcraft 101. Some of the rate sensor signals are filtered with a lag compensator to estimate angular position around the respective axes. Further, some of the rate sensor signals or estimated angular position signals are filtered with a washout filter to remove steady state signal components.

Figure 6:
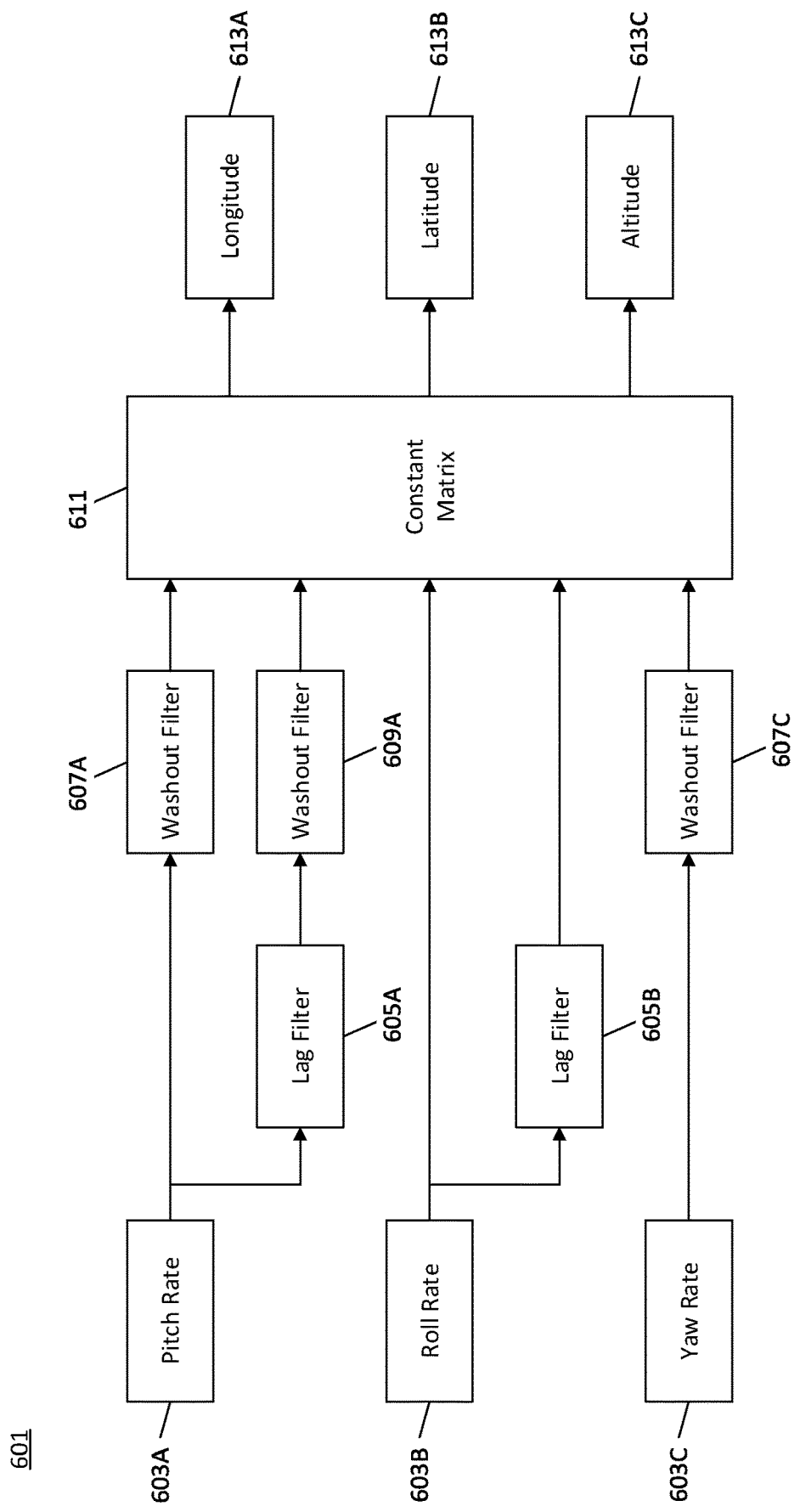
FIG. 6 is a block diagram of a method for vertical speed estimation, according to some embodiments.

FIG. 6 is a block diagram of a system 601 for controlling flight of the rotorcraft 101, according to some embodiments. The method 401 may be executed by the system 601. In the system 601, a pitch rate signal 603A, roll rate signal 603B, and yaw rate signal 603C are obtained from respective sensors. The pitch rate signal is filtered with a lag filter 605A to estimate the angular position around the pitch axis. The pitch rate signal is filtered with a washout filter 607A, and the lagged pitch rate signal is filtered with a washout filter 609A. The roll rate signal is filtered with a lag filter 605B to estimate the angular position around the roll axis. The roll rate signal and the lagged roll rate signal are not filtered with washout filters, as the roll rate tends to be low when trimmed. The yaw rate signal is not lagged, but is filtered with a washout filter 607C. Finally, the pitch rate signal, lagged pitch rate signal, roll rate signal, lagged roll rate signal, and yaw rate signal are combined by multiplication with a constant matrix 611, such as a 3×5 matrix. The resulting matrix product includes the estimated longitude 613A, estimated latitude 613B, and estimated altitude 613C. The flight control devices of the rotorcraft 101 are adjusted according to the estimated longitude 613A, estimated latitude 613B, and estimated altitude 613C.

The estimated longitude 613A, estimated latitude 613B, and estimated altitude 613C are weighted sums of the washed pitch rate signal, the washed lagged pitch rate signal, the roll rate signal, the lagged roll rate signal, and the washed yaw rate signal. The weights used when determining each estimated angular position may (or may not) be different. In other words, some or all values of the constant matrix 611 may be different. Further, the constant matrix 611 may be gain scheduled such that the values of the constant matrix 611 change during operation of the rotorcraft 101. Gain scheduling may be performed according to one or more parameters, such as airspeed of the rotorcraft 101. For example, a first constant matrix 611 may be used at a first airspeed, and a different second constant matrix 611 may be used at a different second airspeed.

Embodiments may achieve advantages. The estimated angular position may on average be more accurate than angular position values from absolute attitude sensors across the envelope of all possible airspeeds of the rotorcraft 101. The angular position values used by the inner loop 317 may be more reliable, which may cause the pilot the perceive improved handling. Further, gain scheduling may be avoided, and the angular position values used by the inner loop 317 may be usable in all or most situations.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
    obtaining a first signal from a rate sensor of a rotorcraft, the first signal indicating measured angular velocity around a first axis of the rotorcraft;
    filtering the first signal with a lag compensator to obtain an estimated angular position around the first axis of the rotorcraft;
    obtaining a second signal from an absolute sensor of the rotorcraft, the second signal indicating measured angular position around the first axis of the rotorcraft, the absolute sensor being a different type of sensor than the rate sensor; and
    adjusting flight control devices of the rotorcraft according to the estimated angular position and the measured angular position around the first axis of the rotorcraft, thereby changing flight characteristics of the rotorcraft around the first axis of the rotorcraft, wherein adjusting the flight control devices of the rotorcraft comprises:
        executing a first flight control procedure according to the estimated angular position around the first axis of the rotorcraft, the first flight control procedure not using the measured angular position around the first axis of the rotorcraft; and
        executing a second flight control procedure according to the measured angular position around the first axis of the rotorcraft, the first flight control procedure having greater authority than the second flight control procedure.

2. The method of claim 1, further comprising:
    receiving a control signal from a pilot flight control of the rotorcraft; and
    adjusting the flight control devices of the rotorcraft according to the control signal, thereby changing flight characteristics of the rotorcraft around a second axis of the rotorcraft, the second axis being different from the first axis,
    wherein the flight characteristics of the rotorcraft around the first axis of the rotorcraft are changed in response to changing the flight characteristics of the rotorcraft around the second axis of the rotorcraft.

3. The method of claim 1, wherein the rate sensor is a gyroscope, and obtaining the first signal comprises:
    receiving the first signal from the gyroscope.

4. The method of claim 1, wherein the rate sensor is an accelerometer, and obtaining the first signal comprises:
    receiving a transduced sensor signal from the accelerometer, the transduced sensor signal indicating angular acceleration around the first axis of the rotorcraft; and
    integrating the transduced sensor signal with respect to time to obtain the first signal.

5. The method of claim 1, wherein the estimated angular position around the first axis of the rotorcraft is estimated using only the measured angular velocity around the first axis of the rotorcraft.

6. The method of claim 1, wherein the lag compensator has a same set of gains at all operating points of the lag compensator, the set of gains being predetermined independent of airspeed of the rotorcraft.

7. The method of claim 1, wherein the lag compensator has different sets of gains at different operating points of the lag compensator.

8. The method of claim 1, wherein the absolute sensor is an attitude sensor.

9. A rotorcraft comprising:
a rate sensor;
an absolute sensor, the absolute sensor being a different type of sensor than the rate sensor;
flight control devices; and
a flight control computer coupled to the rate sensor and the flight control devices, the flight control computer configured to:
obtain a first signal from the rate sensor, the first signal indicating measured angular velocity around a first axis of the rotorcraft;
filter the first signal with a lag compensator to obtain an estimated angular position around the first axis of the rotorcraft;
obtain a second signal from the absolute sensor, the second signal indicating measured angular position around the first axis of the rotorcraft; and
adjust the flight control devices according to the estimated angular position and the measured angular velocity around the first axis of the rotorcraft, thereby changing flight characteristics of the rotorcraft around the first axis of the rotorcraft, wherein the flight control computer is configured to adjust the flight control devices of the rotorcraft by:
executing a first flight control procedure according to the estimated angular position around the first axis of the rotorcraft, the first flight control procedure not using the measured angular position around the first axis of the rotorcraft; and
executing a second flight control procedure according to the measured angular position around the first axis of the rotorcraft, the first flight control procedure having greater authority than the second flight control procedure.

10. The rotorcraft of claim 9, further comprising:
a pilot flight control, wherein the flight control computer is further configured to:
receive a control signal from the pilot flight control; and
adjust the flight control devices according to the control signal, thereby changing flight characteristics of the rotorcraft around a second axis of the rotorcraft, the second axis being different from the first axis,
wherein the flight characteristics of the rotorcraft around the first axis of the rotorcraft are changed in response to changing the flight characteristics of the rotorcraft around the second axis of the rotorcraft.

11. The rotorcraft of claim 9, wherein the rate sensor is a gyroscope, and the flight control computer is configured to obtain the first signal by:
receiving the first signal from the gyroscope.

12. The rotorcraft of claim 9, wherein the rate sensor is an accelerometer, and the flight control computer is configured to obtain the first signal by:
receiving a transduced sensor signal from the accelerometer, the transduced sensor signal indicating angular acceleration around the first axis of the rotorcraft; and
integrating the transduced sensor signal with respect to time to obtain the first signal.

13. The rotorcraft of claim 9, wherein the estimated angular position around the first axis of the rotorcraft is estimated using only the measured angular velocity around the first axis of the rotorcraft.

14. The rotorcraft of claim 9, wherein the lag compensator has a same set of gains at all operating points of the lag compensator, the set of gains being predetermined independent of airspeed of the rotorcraft.

15. The rotorcraft of claim 9, wherein the lag compensator has different sets of gains at different operating points of the lag compensator.

16. The rotorcraft of claim 9, wherein the absolute sensor is an attitude sensor.

17. A flight control computer comprising:
a processor; and
a non-transitory computer readable storage medium storing programming for execution by the processor, the programming including instructions for:
obtaining a first signal from a rate sensor of a rotorcraft, the first signal indicating measured angular velocity around a first axis of the rotorcraft;
filtering the first signal with a lag compensator to obtain an estimated angular position around the first axis of the rotorcraft;
obtaining a second signal from an absolute sensor of the rotorcraft, the second signal indicating measured angular position around the first axis of the rotorcraft, the absolute sensor being a different type of sensor than the rate sensor; and
adjusting flight control devices of the rotorcraft according to the estimated angular position and the measured angular velocity around the first axis of the rotorcraft, thereby changing flight characteristics of the rotorcraft around the first axis of the rotorcraft, wherein the instructions for adjusting the flight control devices of the rotorcraft comprise instructions for:
executing a first flight control procedure according to the estimated angular position around the first axis of the rotorcraft, the first flight control procedure not using the measured angular position around the first axis of the rotorcraft; and
executing a second flight control procedure according to the measured angular position around the first axis of the rotorcraft, the first flight control procedure having greater authority than the second flight control procedure.

18. The flight control computer of claim 17, wherein the programming includes further instructions for:
receiving a control signal from a pilot flight control of the rotorcraft; and
adjusting the flight control devices of the rotorcraft according to the control signal, thereby changing flight characteristics of the rotorcraft around a second axis of the rotorcraft, the second axis being different from the first axis,
wherein the flight characteristics of the rotorcraft around the first axis of the rotorcraft are changed in response to changing the flight characteristics of the rotorcraft around the second axis of the rotorcraft.

19. The flight control computer of claim 17, wherein the rate sensor is a gyroscope, and the instructions for obtaining the first signal comprise instructions for:
  receiving the first signal from the gyroscope.

20. The flight control computer of claim 17, wherein the rate sensor is an accelerometer, and the instructions for obtaining the first signal comprise instructions for:
  receiving a transduced sensor signal from the accelerometer, the transduced sensor signal indicating angular acceleration around the first axis of the rotorcraft; and
  integrating the transduced sensor signal with respect to time to obtain the first signal.

21. The flight control computer of claim 17, wherein the estimated angular position around the first axis of the rotorcraft is estimated using only the measured angular velocity around the first axis of the rotorcraft.

22. The flight control computer of claim 17, wherein the lag compensator has a same set of gains at all operating points of the lag compensator, the set of gains being predetermined independent of airspeed of the rotorcraft.

23. The flight control computer of claim 17, wherein the lag compensator has different sets of gains at different operating points of the lag compensator.

24. The flight control computer of claim 17, wherein the absolute sensor is an attitude sensor.

\* \* \* \* \*